United States Patent [19]

Kawakami et al.

[11] Patent Number: 5,036,150

[45] Date of Patent: Jul. 30, 1991

[54] POLYARYLATES HAVING IMPROVED HYDROLYTIC STABILITY

[75] Inventors: James H. Kawakami; James E. Harris, both of Piscataway; Louis M. Maresca, Belle Mead; Lloyd M. Robeson, Whitehouse Station, all of N.J.

[73] Assignee: Amoco Corporation, Chicago, Ill.

[21] Appl. No.: 512,125

[22] Filed: Apr. 20, 1990

Related U.S. Application Data

[63] Continuation of Ser. No. 591,546, Mar. 20, 1984, abandoned.

[51] Int. Cl.$^5$ .............................................. C08G 75/28
[52] U.S. Cl. ..................................... 528/173; 528/125; 528/126; 528/128; 528/174; 528/191; 528/193; 528/194; 525/439
[58] Field of Search ................ 528/173, 125, 126, 128, 528/174, 191, 193, 194; 525/439

[56] References Cited

U.S. PATENT DOCUMENTS

| | | | |
|---|---|---|---|
| 4,116,940 | 9/1978 | Korshak et al. | 528/173 |
| 4,390,682 | 6/1983 | Kyo et al. | 528/194 |
| 4,440,920 | 4/1984 | Fujikake et al. | 528/128 |
| 4,499,257 | 2/1985 | Maresca | 528/173 |

Primary Examiner—John Kight, III
Assistant Examiner—S. A. Acquah
Attorney, Agent, or Firm—Matthew R. Hooper; William H. Magidson; Ralph C. Medhurst

[57] ABSTRACT

This invention relates to moldable polyarylates and in particular to moldable polyarylate compositions which have repeating units derived from bis-(3,5-dimethyl-4-hydroxyphenyl) sulfone (TMBS), optionally a dihydric phenol such as 2,2-bis-(4-hydroxyphenyl)-propane (Bisphenol A) and a mixture of isophthalic acid and terephthalic acid or derivatives thereof. Such polyarylates exhibit improved hydrolytic stability.

3 Claims, No Drawings

POLYARYLATES HAVING IMPROVED HYDROLYTIC STABILITY

This is a continuation of application Ser. No. 591,546, filed Mar. 20, 1984, now abandoned.

BRIEF SUMMARY OF THE INVENTION

1. Technical Field

This invention relates in general to moldable polyarylates, also known as aromatic polyesters, and in particular to moldable polyarylate compositions which contain repeating units derived from bis-(3,5-dimethyl-4-hydroxyphenyl) sulfone (TMBS), optionally a dihydric phenol such as 2,2-bis-(4-hydroxyphenyl)propane (Bisphenol A) and a mixture of isophthalic acid and terephthalic acid or derivatives thereof. Such polyarylates exhibit improved hydrolytic stability.

2. Background of the Invention

Polyarylates are aromatic polyesters derived from a dihydric phenol, particularly 2,2-bis-(4-hydroxyphenyl)propane (Bisphenol A), and an aromatic dicarboxylic acid, particularly mixtures of terephthalic and isophthalic acids. Illustrative polyarylates are described, for example, in V. V. Korshak and S. V. Vinogradova, Polyesters, 1965, Pergamon Press, New York, Chapter IX. Polyarylates are high temperature, high performance thermoplastic polymers with a good combination of thermal and mechanical properties. Polyarylates also have good processability which allows them to be molded into a variety of articles.

However, when polyarylates are exposed to a hydrolytic environment under excessive time and/or temperature conditions, the hydrolytic stability of the polyarylates is generally poor which results in poor mechanical properties. Poor hydrolytic stability is reflected by a rapid decrease in reduced viscosity of the polyarylates resulting from exposure to the hydrolytic environment. This deficiency also requires careful drying procedures of the polyarylates prior to melt processing.

U.S. Pat. No. 3,652,499 (Borman) describes linear polyesters having recurring structural units derived from, for example, a 4,4'-sulfonyl diphenol such as bis-(3,5-dimethyl-4-hydroxyphenyl)sulfone (TMBS) and an aliphatic polycarboxylic acid halide selected from substituted and unsubstituted malonic, glutaric and pimelic acid halides. The polymers are characterized as being extremely resistant to organic solvents and have substantially the same or better physical properties than polyesters of the prior art.

Characterized in the Borman patent as polyesters of the prior art are the aromatic polyesters of U.S. Pat. No. 3,234,167 (Sweeney). The Sweeney patent describes aromatic polyesters having recurring structural units derived from a bisphenolic compound and an aromatic dicarboxylic acid such as terephthalic and isophthalic acids. From the omnibus formula depicted in column 1, lines 52-60, of the Sweeney patent, one can incidentally portray bis-(3,5-dimethyl-4-oxyphenyl) sulfone derived from TMBS. According to U.S. Pat. No. 3,652,499 (Borman), the aromatic polyesters of U.S. Pat. No. 3,234,167 (Sweeney) are reported to be soluble in organic solvents.

U.S. Pat. No. 4,390,682 (Kyo et al.) describes aromatic polyesters containing terephthaloyl and isophthaloyl repeating units and dioxyarylene units derived from aromatic diols such as Bisphenol A. From the omnibus formulas depicted in column 3, lines 5-34, of the Kyo et al. patent, one can incidentally portray bis-(3,5-dimethyl-4-oxyphenyl)sulfone derived from TMBS. The aromatic polyesters are characterized as having high durability under dry and moist heat as well as high resistance to water crazing. As illustrated in the working examples hereinbelow, polyarylates having repeating units derived from TMBS and a dihydric phenol such as Bisphenol A exhibit greater hydrolytic stability than polyarylates which contain repeating units derived only from bisphenol compounds such as Bisphenol A (no TMBS) as exemplified in Kyo et al.

It has been found as a result of this invention that polyarylates which contain repeating units derived from bis(3-dimethyl-4-hydroxyphenyl) sulfone (TMBS) exhibit improved hydrolytic stability. Such improved hydrolytic stability is attributable to the molecular configuration of repeating units derived from TMBS in which the four methyl groups attached to the aromatic rings of TMBS act to sterically hinder hydrolytic attack against the carbonyl-ether oxygen linkages vicinally positioned in the polymer chain.

DISCLOSURE OF THE INVENTION

This invention relates to moldable polyarylates which have good processability and mechanical properties and which exhibit improved hydrolytic stability. In particular, this invention relates to a composition comprising a polyarylate containing repeating units (I) having the formula

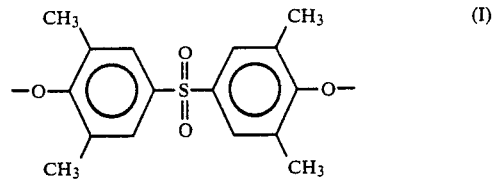

in an amount sufficient to enhance hydrolytic stability of the polyarylate, and optionally repeating units (II) having the formula

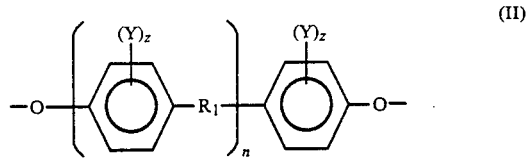

in which repeating units (I) and optionally repeating units (II) are connected by interbonding units (III) having the formula

wherein Y is selected from alkyl groups of 1 to 4 carbon atoms, chlorine or bromine, each z, independently, has a value of from 0 to 4 inclusive, n has a value of 0 or 1, $R_1$ is a divalent saturated or unsaturated aliphatic hydrocarbon radical, particularly an alkylene or alkylidene radical having from 1 to 6 carbon atoms or a cycloalkylidene or cycloalkylene radical having up to and including 9 carbon atoms, O, CO, $SO_2$, S or a direct bond, with the proviso that when $R_1$ is $SO_2$, then repeating unit (II) is not the same as repeating unit (I), Ar is a substituted or unsubstituted meta- or para-phenylene group, and wherein the polyarylate has a reduced viscosity of at least about 0.3 dl/g as measured in chloroform at a concentration of 0.5 g/100 ml at 25° C.

The improved hydrolytic stability exhibited by the polyarylates of this invention can be attributable to the incorporation of repeating units (I) above into the polymer chain. The molecular configuration of repeating units (I) is important in this regard. In particular, the four methyl groups attached to the aromatic rings of repeating units (I) are believed to act to sterically hinder hydrolytic attached against the carbonyl-ester oxygen linkages vicinally positioned in the polymer chain. In constrast, carbonyl-ether oxygen linkages in vicinal positions to, for example, Bisphenol A have no sterically hindering methyl groups, and such is believed to explain why such a polymer would be more susceptible to hydrolytic attack. In general, those polyarylates containing a higher concentration of repeating units (I) will have the preferred enhanced hydrolytic stability.

DETAILED DESCRIPTION

The polyarylates of this invention can be prepared by any of the polyester of forming reactions known to those skilled in the art. Different additive sequences of reactants can be used. For example, a diacid which gives interbonding units (III) hereinabove and the diphenol reactants which give repeating units (I) and (II) hereinabove are charged and polymerized simultaneously. In another sequence, one of the diphenol reactants which give either repeating units (I) or (II) hereinabove is charged with the acid reactant which gives interbonding units (III) hereinabove, polymerization is initiated, and then the other diphenol reactant which gives either repeating units (I) or (II) hereinabove is added and the reaction is allowed to progress. Other additive sequences of reactants are also plausible.

Illustrative of known polyester forming reactions which can be used to make the polyarylates of this invention include:

(1) The reaction of the acid chlorides of the isophthalic and terephthalic acids which gives interbonding units (III) hereinabove with the diphenols which give repeating units (I) and (II) hereinabove;

(2) The reaction of the aromatic diacids which gives interbonding units (III) hereinabove with diester derivatives of the diphenols having the formulas

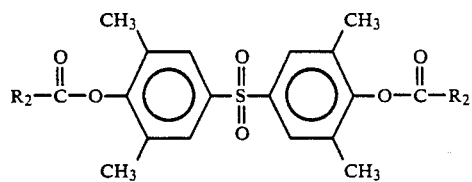

(IV)

and

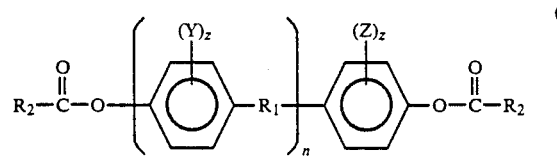

(V)

where Y, z, n and $R_1$ are as defined hereinabove and where $R_2 = C_1$ to $C_{20}$ aliphatic skeletons, hereinafter referred to as the Diacetate Process; and (3) The reaction of the diaryl esters of the aromatic diacids having the formula

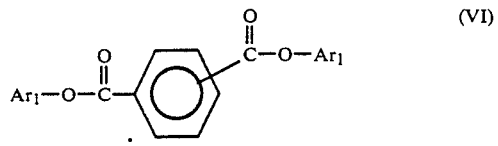

(VI)

where $Ar_1$ can be a phenyl, o-tolyl, m-tolyl, p-tolyl, or like residues, with the diphenols which give repeating units (I) and (II) hereinabove, hereinafter referred to as the Diphenate Process.

Two procedures can be used for the preparation of the polyarylates of this invention via the acid chloride route. One is carried out at low temperature and the other at high temperature. In the low temperature technique, polycondensation of the acid chlorides derived from terephthalic and isophthalic acid which give interbonding units (III) hereinabove with the dihydric phenols which give repeating units (I) and (II) hereinabove is effected at ambient temperatures in an inert solvent, such as methylene chloride, in the presence of a basic catalyst and an acid acceptor. A second immiscible solvent, e.g., water, may be present. In the high temperature technique, polycondensation of acid chlorides which give interbonding units (III) hereinabove with the dihydric phenols which give repeating units (I) and (II) hereinabove is effected in a high boiling solvent, such as 1,2,4-trichlorobenzene, at temperatures above about 150° C., and preferably at about 200° to about 220° C.

Other suitable inert organic solvents useful for low temperature polycondensation include halogenated aliphatic compounds, such as, chloroform, methylene bromide, 1,1,2-trichloroethane as well as methylene chloride mentioned above and the like; and cyclic ethers such as tetrahydrofuran, dioxane, and the like. For the high temperature polycondensation, suitable solvents include halogenated aromatic compounds such as, o-dichlorobenzene, 1,2,4-trichlorobenzene or diphenyl ether, diphenyl sulfone, benzoic acid alkyl esters wherein the alkyl group contains 1 to about 12 carbon atoms, phenolic ethers, such as, anisole and the like.

Preferred acid acceptors for use in the low temperature polycondensation are alkali metal and alkaline earth metal hydroxides including sodium, potassium, barium, calcium, strontium, magnesium, and beryllium hydroxide.

Useful basic catalysts for use in the low temperature polycondensation include tertiary amines such as alkyl amines, including trimethylamine, triethylamine, tripropylamine, tributylamine, tributylamine, and the lik; where the alkyl group contains from 1 to about 10 carbon atoms; alkaryl amines such as N,N-dimethylaniline; N,N-diethylaniline, N,N-dimethylnaphthylamine, benzyl dimethylamine, alpha-methylbenzyl dimethylamine, pyridine, cyclic diazo compounds, such as, diazobicyclooctane (DABCO), diazobicyclononene (DBN) and diazobicycloundecene (DBU) and the like.

Polymerizations using the Diacetate Process can be carried out in the melt at between 260° C. and 340° C., preferably between 275° C. and 320° C. They can also be carried out either as a solution reaction at those temperatures or a suspension reaction also at those temperatures. The solvent(s) or suspending agent(s) can be one of any number of organic compounds boiling between 140° C. and 340° C. They can be chosen from hydrocarbons, ketones, ethers, or sulfones which are inert under the reaction conditions. These polymerizations may or may not be run in the presence of a catalyst. Typical solvents are tetramethylene sulfone, diphenyl ether, substituted diphenyl ether, and the like. Typical catalysts include Na, Li, K salts (organic and inorganic), transition metal salts, alkaline earth metals salts, e.g., Mg acetate, and the like. They may be performed at atmospheric pressure, super atmospheric pressure, or subatmospheric pressure.

Polymerizations using the Diphenate Process can be carried out in the melt at between 250° C. and 350° C. The preferred temperature range is about 275° C. to 320° C. In general, reduced pressure for the final portions of the reaction is used. The polymerizations can also be carried out either as a solution reaction or suspension reaction under those conditions. The solvent(s) or suspending agent(s) are the same as those described above. Typical catalysts include tin compounds and generally those mentioned above for the Diacetate Process. Particularly preferred catalysts are Ti and tin salts, Mg acetate, and alkali metal salts, alkoxides and phenoxides.

If desired, a chain stopper can be used to control the molecular weight of the polyarylates, obtained. Suitable chain stoppers agents include monohydric phenols or their derivatives, such as, p-phenylphenol, and the like and monofunctional carboxylic acid or their derivatives, such as benzoic or naphtholic acids, and the like.

The diphenol reactant bis-(3,5-dimethyl-4-hydroxyphenyl)sulfone (TMBS) which gives repeating units (I) hereinabove can be prepared according to the process described in U.S. Pat. No. 3,383,421. Diester derivatives of TMBS as described in Formula (IV) hereinabove can also be prepared according to known processes.

Suitable dihydric phenols other than bis-(3,5-dimethyl-4-hydroxyphenol)sulfone (TMBS) which give repeating units (II) hereinabove include the following:
2,2-bis(4-hydroxyphenyl)propane (Bisphenol A);
bis-(2-hydroxyphenyl)methane;
bis(4-hydroxyphenyl)methane;
bis-(4-hydroxy-2,6-dimethyl-3-methoxyphenol)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(3-methyl-4-hydroxyphenyl)ethane;
1,3-bis-(3-methyl-4-hydroxyphenyl)propane;
2,2-bis-(3-methyl-4-hydroxyphenyl)propane;
2,2-bis-(3-isopropyl-4-hydroxyphenyl)propane;
2,2-bis-(3-isopropyl-4-hydroxyphenyl)propane;
2,2-bis-(4-hydroxyphenyl)protane;
3,3-bis-(4-hydroxyphenyl)protane;
2,2-bis-(4-hydroxyphenyl)heptane;
1,2-bis-(4-hydroxyphenyl)1,2-bis-(phenyl)-propane;
4,4'-(dihydroxyphenyl)ether;
4,4'-(dihydroxyphenyl)sulfide;
4,4'-(dihydroxyphenyl)sulfoxide;
hydroquinone; and
naphthalene diols.

Other bisphenol compounds suitable for use in this invention are disclosed in U.S. Pat. Nos. 2,999,835, 3,028,365 and 3,334,154. Preferred dihydric phenols include 2,2-bis-(4-hydroxyphenyl)propane (Bisphenol a) and bis-(4-hydroxyphenyl)sulfone (Bisphenol S). Glycols and aliphatic dihydroxy compounds othen than bisphenols in amounts typically not greater than about 10 weight percent of the total weight of repeating units (I) and (II) in the polyarylate can also be useful in preparing the polyarylates of this invention. Diester derivatives of these dihydric phenols as described in Formula (V) hereinabove can also be prepared according to known processes.

Suitable aromatic difunctional acids and acid halides which give interbonding units (III) hereinabove include isophthaloyl acid and chloride, terephthaloyl acid and chloride, mixtures of isophthaloyl and terephthalyl acids and chlorides, 2,5-dichloroterephthaloyl acid and chloride, 5-tert-butyl-isophthaloyl acid and chloride, 2-chloroisophthaloyl acid and chloride, 4-chloroisophthaloyl acid and chloride, 5-chloroisophthaloyl acid and chloride, any of the naphthalene dicarboxylic acids and acid halides and the like. The aromatic ring may be substituted with substituents such as alkyl groups containing from 1 to 4 carbon atoms, alkoxy groups containing from 1 to 4 carbon atoms, aryl, halogen and the like.

Other suitable aromatic difunctional acids and acid halides which can be used in preparing the polyarylates of this invention include the substituted and unsubstituted 4,4'-biphenyl dicarboxylic acid, 4,4'-diphenyloxide dicarboxylic acid, halide derivatives thereof and the like. Moreover, hydroxyaromatic acids and derivatives thereof such as 4-hydroxybenzoic acid and the like can be used in this invention. Diaryl esters of these aromatic difunctional acids and derivatives thereof can also be useful in preparing the polyarylates of this invention.

The preferred aromatic difunctional acids or derivatives for use in preparing the polyarylates of this invention include isophthalic acid, terephthalic acid and mixtures of isophthalic and terephthalic acid.

The reaction for preparing the polyarylates of this invention proceeds on a stoichiometric basis such that the desired polyarylate is formed. Stoichiometry is not critical and the only requirement is that the amounts employed are sufficient to form the polyarylate of the desired molecular weight having enhanced hydrolytic stability. The preferred polyarylate of this invention has the following structural formula

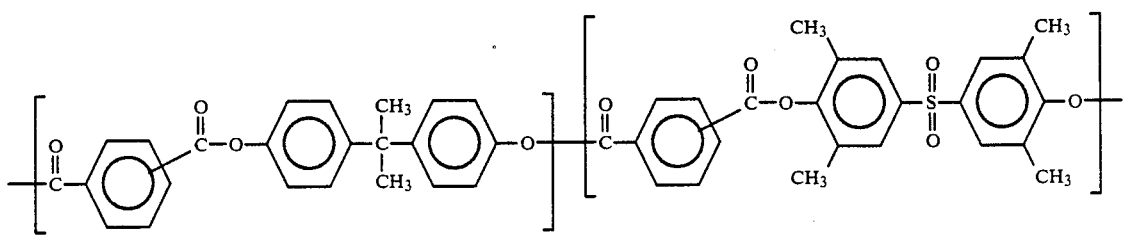

wherein the polyarylate has a reduced viscosity of at least about 0.3 dl/g as measured in chloroform at a concentration of 0.5 g/100 ml at 25° C. Another preferred polyarylate of this invention has the following structural formula

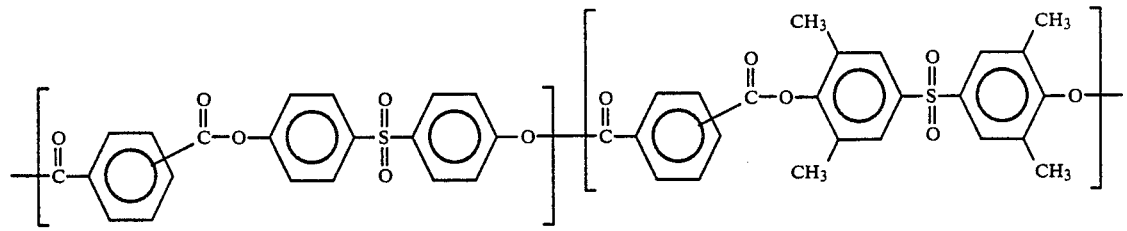

wherein the polyarylate has a reduced viscosity of at least about 0.3 dl/g as measured in chloroform at a concentration of 0.5 g/100 ml at 25° C.

By varying the amounts of reactants, one can vary the polyarylate polymer ultimately produced and its properties. For example, in general, the polyarylate polymers of this invention containing the greater weight percentages of repeating units (I) will preferably have the better hydrolytic stability. This is attributable to the molecular configuration of repeating units (I) in which the four methyl groups attached to the aromatic rings of repeating units (I) act to sterically hinder hydrolytic attack against the carbonyl-ether oxygen linkages vicinally positioned in the polymer chain. As hydrolytic stability can be enhanced by even minor amounts of repeating units (I), the concentration of repeating units (I) in the polyarylates of this invention is not narrowly critical and can be varied over a wide range. The only requirement is that the polyarylates of this invention contain a sufficient amount of repeating units (I) to enhance hydrolytic stability thereof.

In particular, the polyarylates of this invention can preferably contain from about 5 weight percent or less to about 95 weight percent or greater of repeating units (I) hereinabove, together with interbonding units (III) hereinabove, more preferably from about 25 weight percent to about 75 weight percent, and most preferably from about 40 weight percent to about 60 weight percent. The polyarylates of this invention can preferably contain from about 95 weight percent or greater to about 5 weight percent or less of repeating units (II) hereinabove, together with interbonding units (III) hereinabove, more preferably from about 75 weight percent to about 25 weight percent, and most preferably from about 60 weight percent to about 40 weight percent. In general, those polyarylates containing the higher weight percentages of repeating units (I) will preferably have the better hydrolytic stability, and those polyarylates containing the higher weight percentages of repeating units (II) will preferably have the better processability.

The structure of the polyarylate polymers of this invention can be modified to some extent by including in the polymerization reaction other dihydroxy compounds, typically not more than about 10 weight percent of the total weight of the repeating units (I) and (II) in the polyarylate. For example, one might include along with Bisphenol-A and bis-(3,5-dimethyl-4-hydroxyphenyl)-sulfone (TMBS), other dihydroxy compounds either as such or in the diester form, as a partial substitute and modifier of the polymeric structure, without adversely affecting the overall properties of the polymeric structure of this invention. For example, such dihydroxy compounds as ethylene glycol, propylene glycol, 1,4-butylene glycol, and the like can be included in the polymerization reactions to manufacture the polyarylate polymers of this invention.

Additionally, the preparation of the polyarylates of this invention via the Diacetate Process or Diphenate Process may be carried out in the presence of from about 10 to about 60 weight percent, based on the weight of the polyarylate produced, of a processing aid. The preferred processing aids are diphenyl ether compounds, a cycloaliphatic, substituted aromatic, or heteroaromatic compound, and a halogenated and/or etherated substituted aromatic or heteroaromatic compound, or mixtures of these. Such a processing aid may be useful in controlling and/or modifying viscosity, reaction time, color, stability and the like.

Polymer recovery can be achieved by processes well known in the art to recover a moldable polyarylate such as by coagulation and filtration.

In addition, the polyarylates of this invention exhibit excellent compatibility with polyethersulfones such as those which are described in U.S. Pat. Nos. 3,264,536 and 4,175,175, as well as with poly(arylether)s, poly(ester-carbonate)s, polyesters, polycarbonates, poly(ether imide)s, styrenic polymers, vinyl chloride containing polymers and the like. In some instances, it may be desirable to blend the polyarylates of the invention with other polymers exhibiting mechanical compatibility with the polyarylate polymers. Mechanical compatibility refers to a balance of mechanical properties, e.g., strength, toughness and the like, in miscible blend systems which is generally an average of the mechanical properties of the particular blend constituents. Such moldable and compatible blends may typically contain from about 5 weight percent to about 95 weight percent of the polyarylates of this invention and from about 95 weight percent to about 5 weight percent of a polymer exhibiting mechanical compatibility with the polyarylate. The weight percent ratio of the polymers may vary widely depending upon the properties sought from the molded products made from the blend.

Blending may be done in the usual fashion, such as by simple mixing of powders of the polymers, though usually in an extruder mixer. The extruded product will typically be a melt mixture of the polyarylate and the polymer blended therewith. Such an extruded product can be pelleted and used as such in making molded articles of commerce.

The polyarylates of this invention utilized in manufacturing molded articles may be optionally used with other ingredients such as stabilizers, i.e., metal oxides such as zinc oxide, antioxidants, flame retardants, pigments, and the like. The polyarylates may be optionally used with reinforcing fibers and/or inorganic fillers. The reinforcing fiber includes fiberglass, carbon fibers, and the like, and mixtures thereof. The carbon fibers include those having a high Young's modulus of elasticity and high tensile strength. These carbon fibers may be produced from pitch, as described in U.S. Pat. Nos. 3,976,729; 4,005,183 and 4,026,788, for example. The particulate inorganic fillers which may be used include wollastonite, calcium carbonate, glass beads, talc, mica, clay, quartz and the like, or mixtures thereof.

The fiber reinforcement, filler or combinations thereof, can be utilized in amounts of from 0 to about 50 weight percent, preferably from about 10 to about 35 weight percent, of the total weight of the molded article.

The polyarylates of this invention utilized in manufacturing molded articles in combination with one or more other ingredients can be prepared by any conventional mixing methods. For example, the polyarylates and other optional ingredients in powder or granular form can be blended in an extruder and the mixture can be extruded into strands and the strands can be chopped into pellets. The pellets can then be molded into the desired article by conventional techniques such as compression molding, thermoforming, blow molding and injection molding.

The molecular weight of these polyarylate polymers is indicated by reduced viscosity in indicated solvents. As well understood in the art, the viscosity of a resin solution bears a direct relationship to the weight average molecular size of the polymer chains, and is typically the most important single property that can be used to characterize the degree of polymerization. The reduced viscosity assigned to the polymeric materials of this invention is therefore to be understood as significant in reflecting molecular size rather than consideration concerning the viscosity per se. Most of these polyarylate polymers have indicated ready solubility in N-methylpyrrolidinone, chloroform, or tetrachloroethane or other similar solvent.

Reduced viscosity (R.V.) as used herein was determined by dissolving a 0.2 or 0.5 gram sample of polyarylate polymer in the indicated solvent, i.e., chloroform, contained in a 100 milliliter volumetric flask so that the resultant solution measured exactly 100 milliliters at 25° C. in a constant temperature bath. The viscosity of 3 milliliters of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{C \cdot t_o}$$

wherein:
$t_o$ is the efflux time of the pure solvent;
$t_s$ is the efflux time of the polymer solution; and
C is the concentration of the polymer solution expressed in terms of grams of polymer per 100 milliliters of solution.

The polyarylates of this invention are characterized as linear thermoplastic structures which have a relatively high molecular weight, that is, a reduced viscosity determined at a concentration of 0.5 g/100 ml in chloroform at 25° C. of at least 0.3 dl/g, preferably at least 0.5 dl/g and, typically not exceeding about 1.5 dl/g. These polymers are exceptionally tough and possess superior hydrolytic stability in comparison with conventional Bisphenol A polyarylates of the prior art.

Although this invention has been described with respect to a number of details, it is not intended that this invention should be limited thereby. The examples which follow are intended solely to illustrate the embodiments of this invention which to date have been determined and are not intended in any way to limit the scope and intent of this invention.

EXAMPLE 1

To a 4-necked 500 milliliter flask fitted with a nitrogen inlet port, mechanical stirrer, reflux condenser, claisen head, thermometer and a 20% sodium hydroxide trap was added 14.27 grams (0.025 moles) of 2,2-bis-(4-hydroxyphenyl)propane (Bisphenol A), 19.14 grams (0.0625 moles) of bis(3,5-dimethyl-4-hydroxyphenyl)-sulfone (TMBS), 12.69 grams (0.0625 moles) of isophthaloyl chloride, 12.69 grams (0.0625 moles) of terephthaloyl chloride, and 175 milliliters of 1,2,4-trichlorobenzene. The contents of the flask were then heated to a temperature of 210° C. and maintained at this temperature for a period of 16 hours with continuous stirring. A sample removed from the flask after this reaction period had a reduced viscosity of 0.157 at 25° C. in 0.5% chloroform solution. An additional 0.507 grams (0.0025 moles) of terephthaloyl chloride was added to the flask, and the contents in the flask were reacted for another 16 hour period at a temperature of 210° C. with continuous stirring. A sample removed from the flask after this second 16 hour reaction period had a reduced viscosity of 0.35 at 25° C. in 0.5% chloroform solution. An additional 0.57 grams (0.0028 moles) of terephthaloyl chloride and 0.57 grams (0.0025 moles) of 2,2-bis-(4-hydroxyphenyl)propane (Bisphenol A) were then added to the flask over a period of 24 hours at a temperature of 210° C. with continuous stirring. The resulting mixture was then coagulated in methanol, filtered and washed with methanol. The polymer was dried under vacuum at a temperature of 100° C. The reduced viscosity at 25° C. in 0.5% chloroform solution was 0.46.

COMPARATIVE EXAMPLE A

A sample of Bisphenol A polyarylate (commercially available from Union Carbide Corporation, Danbury, Conn. as Ardel D-100 prepared from Bisphenol A and a mixture of 50 mole percent each of terephthaloyl and isophthaloyl chlorides by conventional methods) was compression molded into a plaque in a 4 inch×4 inch×0.020 inch cavity mold at 300° C. using a South Bend hydraulic press with heated platens. The reduced viscosity of the polymer composition of the plaque was determined and, after placing the plaque in boiling distilled water, the reduced viscosity of the polymer composition of the plaque was again determined at various periods of time (boiling distilled water immersion) as specified in Table A hereinbelow. All reduced viscosity values in Table A were determined at a temperature of 25° C. in a 0.2% chloroform solution. The results in Table A indicate the ratio of the reduced viscosity of the polymer composition at the specified time to the initial reduced viscosity of the polymer composition determined before placing the plaque in boiling water.

EXAMPLE 2

A sample of the Bisphenol A/TMBS polyarylate prepared in Example 1 was compression molded into a plaque in a 4 inch×4 inch×0.020 inch cavity mold at 300° C. using a South Bend hydraulic press with heated platens. The reduced viscosity of the polymer composition of the plaque was determined and, after placing the plaque in boiling distilled water, the reduced viscosity of the polymer composition of the plaque was again determined at various periods of time (boiling distilled water immersion) as specified in Table A. All reduced viscosity values in Table A were determined at a temperature of 25° C. in a 0.2% chloroform solution. The results in Table A indicate the ratio of the reduced viscosity of the polymer composition at the specified time to the initial reduced viscosity of the polymer composition determined before placing the plaque in boiling water.

TABLE A

Ratio of Reduced Viscosity at Indicated Time to Initial Reduced Viscosity as a Function of Time in Boiling Distilled Water

| Plaque Sample Identification | Boiling Distilled Water Immersion (Hours) | | | | |
|---|---|---|---|---|---|
| | 0 | 100 | 308 | 316 | 580 |
| Comparative Example A | 1 | 0.89 | 0.64 | — | 0.42 |
| Example 2 | 1 | 0.93 | — | 0.84 | — |

Table A illustrates that the reduced viscosity of the polymer composition of the plaque prepared in Comparative Example A (control Bisphenol A polyarylate) decreases much more rapidly upon prolonged exposure in boiling distilled water than the reduced viscosity of the polymer composition of the plaque prepared in Example 2 (Bisphenol A/TMBS polyarylate) at similar exposure time. The polymer composition of the plaque prepared in Example 2 shows improved hydrolytic stability in comparison with the polymer composition of the plaque prepared in Comparative Example A. As reduced viscosity is an indication of polymer molecular weight, Bisphenol A/TMBS polyarylates are more hydrolytically stable than comparable Bisphenol A polyarylates which do not contain TMBS.

We claim:

1. A hydrolytically stable polyarylate consisting of the following repeating units:

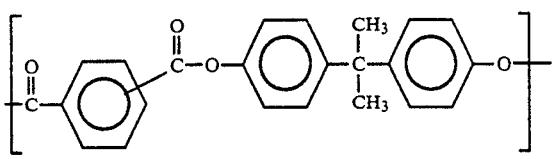

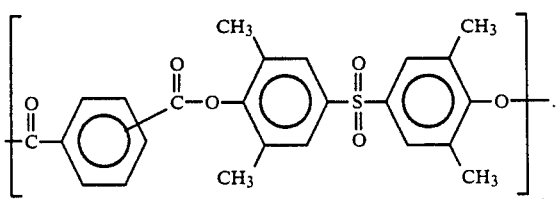

2. A composition as defined in claim 1 in which the polyarylate has a reduced viscosity of at least about 0.5 dl/g as measured in chloroform at a concentration of 0.5 g/100 ml at 25° C.

3. A molded article prepared from the composition of claim 1.

* * * * *

UNITED STATES PATENT OFFICE
CERTIFICATE OF CORRECTION

Patent No. 5,036,150                        Dated   July 30, 1991

Inventor(s)   J. H. Kawakami et al.

It is certified that error appears in the above-identified patent and that said Letters Patent is hereby corrected as shown below:

| Col. | Line | |
|---|---|---|
| 2 | 14 | "bis)3-dimethyl-4-hydroxyphenyl)" and should read --bis(3,5-dimethyl-4-hydroxyphenyl)-- |
| 3 | 11 | "hydrolytic attached" and should read --hydrolytic attack-- |
| 5 | 52 | "2,2-bis-(3-isopropyl-4-hydroxyphenyl and should read --2,2-bis-(2-isopropyl-4-hydroxyphenyl -- |
| 5 | 53 | "2,2-bis-(4-hydroxyphenyl)protane" and should read --2,2-bis-(4-hydroxyphenyl)pentane-- |
| 5 | 54 | "3,3-bis(4-hydroxyphenyl)protane" and should read --3,3-bis(4-hydroxyphenyl)pentane-- |
| 10 | 11 | "14.27 grams (0.025 moles)" and should read --14.27 grams (0.0625 moles)-- |

Signed and Sealed this

Twenty-fourth Day of November, 1992

*Attest:*

DOUGLAS B. COMER

*Attesting Officer*     Acting Commissioner of Patents and Trademarks